Patented Mar. 4, 1924.

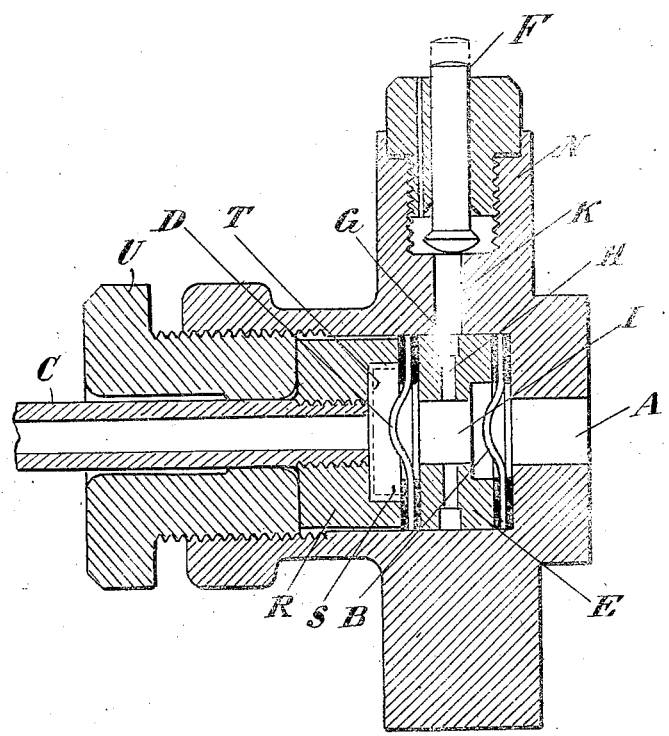

1,485,913

UNITED STATES PATENT OFFICE.

CARL JULIUS ALEXANDER GOTTLIEB, OF AARHUS, DENMARK.

GAS-SAVING SAFETY DEVICE.

Application filed February 23, 1921. Serial No. 447,294.

*To all whom it may concern:*

Be it known that CARL JULIUS ALEXANDER GOTTLIEB, director, residing at Dalgas Avenue, Aarhus, Denmark, has invented certain new and useful Improvements in Gas-Saving Safety Devices, of which the following is a specification.

The invention relates to improvements in safety devices for compressors and has for its object to prevent damage of said devices by excessive pressure as used for instance in refrigerating or gas compressing plants, where the refrigerating medium or gas is led from the safety device into the suction line to avoid loss of medium or gas.

The invention relates more particularly to an arrangement whereby the safety device acts at a certain pressure regardless of the pressure in the suction line.

In safety devices of this type it has often been a disadvantage that the safety device which may be a diaphragm of copper, steel or other suitable material or a spring loaded valve does not burst or open before a certain difference of pressure between high pressure-side and suction-side has been reached, whereby the pressure at which the device acts varies with that of the suction pressure. Thus the high pressure side of the compressor may be submitted to excessive pressures before the safety device is put in action.

For instance a carbonic dioxid compressor working with a direct expansion evaporator placed in a room may be started on a hot day when the temperature of the room is about 20° Centigrade to which corresponds a gas pressure of about 60 atmospheres. If the safety device is set to act at a difference of pressures at 120 atmospheres the high pressure side would be submitted to 60+120=180 atmospheres.

When the temperature of the room is lowered to −10° C. or about 25 atmospheres the safety device acts at 120+25=145 atmospheres.

If the safety device had not been put in connection with the suction side, which is merely done to avoid escaping of the gas, but the latter had been allowed to escape freely into the air the safety device would always act at 120 atmospheres regardless of the suction pressure.

The present invention has for its object to prevent the variation of the high-pressure and at the same time to save the gas from escaping into the surrounding air which might be dangerous and costly.

The drawing shows a cross section of the safety device with diaphragms of copper, steel or other suitable material. Instead of diaphragms ordinary spring loaded relief valves may be used.

Referring to the drawing the safety device is designed as a flange (N) bolted to the high-pressure side of a compressor in such a way that the high-pressure through the bore (A) is stopped by the diaphragm (B) which has a thickness allowing it to withstand 120 atmospheres. The suction side of the compressor is connected to the opposite end of the device or flange (N) by means of the pipe (C) which is held in position by the union (U) and the ring (R) which is screwed and soldered on the pipe (C).

Another diaphragm (D) of less thickness than the diaphragm (B) shuts up the suction-pressure in the pipe (C). The diaphragms are kept at the proper distance by means of the ring (E) which has a groove (G) which by small holes (H) is in connection with the inside bore (I) of the ring (E). By the bore (K) and the valve (F) the atmospheric air-pressure is admitted to the hole (I) between the diaphragms (D) and (B). The recess S has sufficient depth to allow of bursting of the diaphragm D before contacting with the bottom of the recess.

A wire-netting (T) is fitted into the recess to prevent fragments from bursting to enter the pipe (C).

The device acts in following manner: As soon as the pressure in pipe (A) exceeds a certain maximum the diaphragm (B) bursts, the air-valve (F) is forced to its seat by the gas-pressure thus causing the bursting of the other diaphragm (D) which gives free passage for the gas into the suction line. An electric alarm may be connected to the air-valve to call the attention of the engineer.

I claim:

1. In a safety-device for compressors or the like the combination of two yieldable members arranged between the high-pressure side and the suction-side of the compressor, with a channel connecting said yieldable members and normally connected to the atmosphere by an automatic acting air-valve or the like which closes when the high-pressure opens the way for the escape of pressure.

2. A safety device as in claim 1, with a recess of sufficient depth to allow bursting of one of said yieldable members before contacting with the bottom of the recess.

In testimony whereof he affixes his signature.

CARL JULIUS ALEXANDER GOTTLIEB.